United States Patent
Shin et al.

(10) Patent No.: US 9,873,370 B2
(45) Date of Patent: Jan. 23, 2018

(54) HEAD LAMP MODULE FOR VEHICLE

(71) Applicants: Hyundai Motor Company, Seoul (KR); Hyundai Mobis Co., Ltd., Seoul (KR)

(72) Inventors: Jik Soo Shin, Incheon (KR); Byoung Suk Ahn, Gyeonggi-do (KR); Ki Hong Lee, Seoul (KR); Jin Ho Na, Gyeonggi-do (KR); Keon Soo Jin, Ulsan (KR); Gil Won Han, Seoul (KR); Young Geun Jun, Seoul (KR); Sang Hoon Kim, Seoul (KR)

(73) Assignees: Hyundai Motor Company, Seoul (KR); Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 15/237,968

(22) Filed: Aug. 16, 2016

(65) Prior Publication Data
US 2017/0291530 A1    Oct. 12, 2017

(30) Foreign Application Priority Data

Apr. 6, 2016  (KR) .................. 10-2016-0042365

(51) Int. Cl.
| | | |
|---|---|---|
| *F21V 17/02* | (2006.01) | |
| *B60Q 1/076* | (2006.01) | |
| *B60Q 1/04* | (2006.01) | |
| *F21S 8/10* | (2006.01) | |

(52) U.S. Cl.
CPC ........... *B60Q 1/076* (2013.01); *B60Q 1/0491* (2013.01); *F21S 48/13* (2013.01); *F21S 48/1784* (2013.01)

(58) Field of Classification Search
CPC ... B60Q 1/076; B60Q 1/0491; F21S 48/1784; F21S 48/13
USPC ....... 362/512, 460, 464, 465, 466, 469, 513, 362/514
See application file for complete search history.

(56) References Cited

U.S. PATENT DOCUMENTS

| | | | | |
|---|---|---|---|---|
| 1,631,130 | A * | 6/1927 | Hoefler | F21S 48/1768 362/325 |
| 6,948,837 | B2 * | 9/2005 | Suzuki | B60Q 1/1415 362/469 |
| 8,104,938 | B2 * | 1/2012 | Takada | F21S 48/1388 362/277 |

(Continued)

FOREIGN PATENT DOCUMENTS

| | | |
|---|---|---|
| JP | 2001-110213 A | 4/2001 |
| JP | 2002-056708 A | 2/2002 |

(Continued)

*Primary Examiner* — Elmito Breval
*Assistant Examiner* — Glenn Zimmerman
(74) *Attorney, Agent, or Firm* — Mintz Levin Cohn Ferris Glovsky and Popeo, P.C.; Peter F. Corless

(57) ABSTRACT

A head lamp module for a vehicle is provided. The head lamp module includes a shield that is configured to be rotated by operations of first and second solenoids and first and second shield operation mechanisms and a beam pattern of a low beam mode, a beam pattern of a high beam mode, or a beam pattern of an ADB mode that is implemented based on a rotation angle of the shield. The beam pattern of the low beam mode is implemented when a fail safe function is performed based on a failure occurrence in the high beam mode or ADB mode state.

10 Claims, 11 Drawing Sheets

(56) References Cited

U.S. PATENT DOCUMENTS

2010/0002457 A1* 1/2010 Takada ............... F21S 48/1388
362/509

FOREIGN PATENT DOCUMENTS

| JP | 2006-164686 A | 6/2006 |
|----|---------------|--------|
| JP | 2011-100662 A | 5/2011 |
| KR | 10-2003-0005781 A | 1/2003 |
| KR | 2012-0050271 A | 5/2012 |

* cited by examiner

HEAD LAMP MODULE FOR VEHICLE

CROSS REFERENCE TO RELATED APPLICATION

The present application claims priority of Korean Patent Application Number 10-2016-0042365 filed on Apr. 6, 2016 the entire contents of which is incorporated herein for all purposes by this reference.

BACKGROUND

Field of the Disclosure

The present disclosure relates to a head lamp module for a vehicle, and more particularly, to a head lamp module for a vehicle capable of implementing a fail safe mode beam pattern as a low beam mode beam pattern when a fail safe function is performed based on a failure occurrence in a high beam mode of operation or an adaptive driving beam (ADB) mode of operation.

Description of the Related Art

Generally, a beam pattern implemented in a head lamp for a vehicle includes a low beam mode, a high beam mode, an adaptive driving beam (ADB) mode, or the like. Among those, the ADB mode automatically adjusts a direction and an angle in which light is irradiated based on a driving condition and uses a technology that sense a preceding vehicle using imaging device sensor to automatically adjusts the high beam mode and the low beam mode. In particular, a shadow zone forms when the preceding vehicle appears while a vehicle is driven in a normal high beam mode. For example, a driver may operate a vehicle and dazzling of a driver of an oncoming vehicle may be prevented.

The normal head lamp module includes a shield provided with protrusions for implementing the low beam mode, the high beam mode, and the ADB mode, a shield motor configured to operate the shield, a gear mechanism that connects the shield motor and the shield, a printed circuit board (PCB) configured to operate the shield motor, a light source, a reflector configured to reflect light from the light source in a forward direction, a case with the components disposed therein and an intelligent smart motor (ISM) coupled to the case. The shield motor is not a general direct current (DC) motor but a stepping motor. When the stepping motor operates, the shield motor may be configured to accurately adjust a rotation angle of the shield but is expensive. In particular, a separate sensor configured to detect a rotational position of the shield and complex control logic is required. Accordingly, application of the shield motor to an inexpensive vehicle is limited. The intelligent smart motor may provide communications to recognize a failure mode and as a result may perform a fail safe function.

Further, the beam pattern of the high beam mode or the ADB mode is irradiated in a more upward direction than that of the low beam mode. In particular, when the shield motor or a driving system for the head lamp fails, the dazzling of the driver of the other vehicle may occur and in severe cases, may cause accidents. Therefore, when a failure mode is recognized, the case may be configured to rotate in a downward direction by a driving of a case motor and the head lamp module that includes the light source, the shield, and the reflector may be configured to rotate in a downward direction by the rotation of the case. Accordingly, the beam pattern of the head lamp may extend along a road surface.

As described above, when the intelligent smart motor is rotated in a downward direction, the existing head lamp module configured to perform the fail safe function may still cause the dazzling effect of the driver of the on-coming vehicle even when the fail safe function is performed or the performance is reduced in the low beam state, thereby reducing driving safety. In other words, the beam pattern of the fail safe mode should not extend beyond the separation line of the low beam. However, when the case is rotated in a downward direction in the high beam mode or ADB mode condition and the fail safe function is performed, thus the beam pattern of the high beam mode or the beam pattern of the ADB mode becomes the beam pattern of the fail safe mode. In other words, when the downward rotation amount of the case is insufficient and thus the beam pattern of the fail safe mode extends beyond the separation line of the low beam, the dazzling of the driver of the oncoming vehicle occurs even after the fail safe function is performed, which may contribute to accidents.

Further, when the case is rotated in a downward direction in the high beam mode or the ADB mode condition to perform the fail safe function and when the downward rotation amount of the case is excessive, the beam pattern of the fail safe mode is irradiated to a greater extent in the downward vertical direction than that of the low beam mode and thus extends substantially along the approach of the road surface. In particular, a visual range of a driver is narrower than in the low beam condition, and reduces the driving safety.

The above information disclosed in this section is merely for enhancement of understanding of the background of the invention and therefore it may contain information that does not form the prior art that is already known in this country to a person of ordinary skill in the art.

SUMMARY

The present disclosure provides a head lamp module for a vehicle capable of reducing costs and implements beam patterns of a high beam mode, a low beam mode, and an ADB mode using a solenoid that is less expensive than a stepping motor and an intelligent smart motor. Another object of the present disclosure implements a beam pattern of a low beam mode when a fail safe function is performed due to a failure occurrence in a high beam mode condition or an ADB mode condition to secure a visual range of a driver, thereby promoting safety driving.

According to an exemplary embodiment of the present disclosure, a head lamp module for a vehicle may include a shield configured to be axially rotated with respect to a shield housing and has a low beam protrusion and an ADB protrusion formed on an exterior circumferential surface thereof and a first solenoid and a second solenoid each fixedly installed at portions that correspond to both end portions of the shield in the shield housing, a first shield operation mechanism and a second shield operation mechanism coupled between the first and second solenoids and both ends of the shield, respectively, and configured to rotate the shield in a first direction when a current is applied to the first and second solenoids and to have a second rotation angle of the shield and a first return spring and a second return spring with both ends fixed to the first and second shield operation mechanism and the shield housing and configured to accumulate an elastic force when the shield is rotated in a first direction and rotate the shield rotated in a second direction using the accumulated elastic force when the current to the first and second solenoids are terminated to return the shield.

The head lamp module may further include a PCB configured to adjust a supply of current to the first and second solenoids, a light source coupled to the PCB and configured to be engaged or disengaged (e.g., turned on or off) based on a control of the PCB, a reflector configured to reflect light from the light source in a forward direction and a case configured to accommodate the shield housing and the reflector fixedly installed therein.

The first shield operation mechanism may include a first crank fixedly coupled to a first end portion of the shield and rotated along with the shield and a first end portion of the first return spring fixedly coupled thereto and a first plunger configured to have a first end portion that contacts the first crank and a second end portion that penetrates through the first solenoid. The second shield operation mechanism may include a second crank fixedly coupled to the second end portion of the shield that may be configured to be rotated along with the shield and have a first end portion of the second return spring fixedly coupled thereto and a second plunger configured to have a first end portion that contacts the second crank and a second end portion that penetrates through the second solenoid and an operation stroke of the second plunger may be configured to extend longer than an operation stroke of the first plunger to generate a difference in a rotation angle of the shield based on operations of the first and second plungers.

The head lamp module may include a stopper coupled to an end portion of a rear of the first plunger that penetrates through the first solenoid and may be configured to adjust a return rotation angle of the shield by contacting a rear surface of the shield housing when the shield is rotated in an opposite direction (e.g., a second direction) by a restoring the return forces of the first return spring and the second return spring.

The first crank may include a pair of first flanges that protrude in a radial direction and a first rod disposed between the first flanges and a first end portion of the first plunger may include a first protrusion that contacts the first rod. The first protrusion may contact a circumference of a front side of the first rod and may be configured to retract the first rod in a backward direction when the first plunger moves toward the first solenoid to rotate the shield in a first direction. The second crank may include a pair of second flanges that protrude in a radial direction and a second rod disposed between the second flanges. A first end portion of the second plunger may include two second protrusions that contact the second rod and the second rod may be disposed between the two second protrusions. The two second protrusions may be configured to retract the second rod in the backward direction when the second plunger moves toward the second solenoid to rotate the shield in a first direction and protrude forward by the contact with the second rod when the shield returns while being rotated in a second direction by the second return spring return the shield.

The head lamp module may include a first damper fixedly installed to the shield housing and configured to contact the first flange to reduce noise and a shock when the shield returns by being rotated in a second direction by the restoring forces of the first return spring and the second return spring. The head lamp module may further include a second damper fixedly installed to the shield housing and configured to contact the second flange to reduce noise and a shock when the shield returns by being rotated in a second direction by the restoring force of the second return spring.

The operation stroke of the first plunger may be a distance from when the first flange contacts the first damper until a first stopper surface formed at the first plunger contacts a front surface of the shield housing based on the backward movement of the first plunger toward the first solenoid. The operation stroke of the second plunger may be a distance from when the second flange contacts the second damper until a second stopper surface formed at the second plunger contacts the front surface of the shield housing based on the backward movement of the second plunger toward the second solenoid.

BRIEF DESCRIPTION OF THE DRAWINGS

The above and other objects, features and other advantages of the present invention will be more clearly understood from the following detailed description when taken in conjunction with the accompanying drawings, in which:

FIG. 9 is an exemplary diagram illustrating a low beam mode of operation when a beam pattern is implemented, in which FIG. 9 is an exemplary perspective view of a head lamp module when the beam pattern of the low beam mode is implemented;

DETAILED DESCRIPTION

Figure 1:
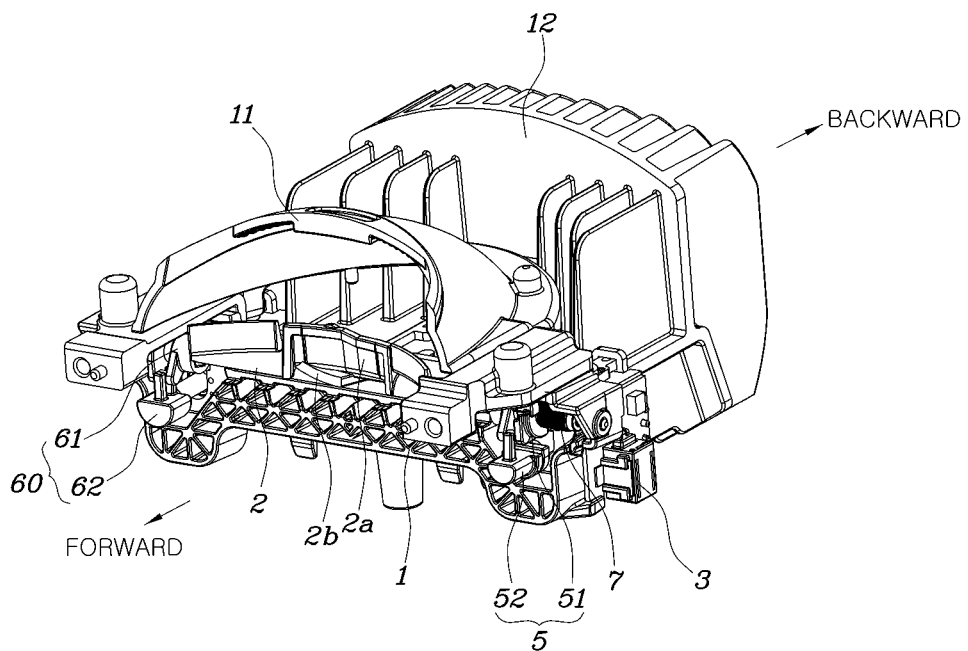
FIG. 1 is an exemplary perspective view of a head lamp module according to an exemplary embodiment of the present disclosure.
Figure 2:
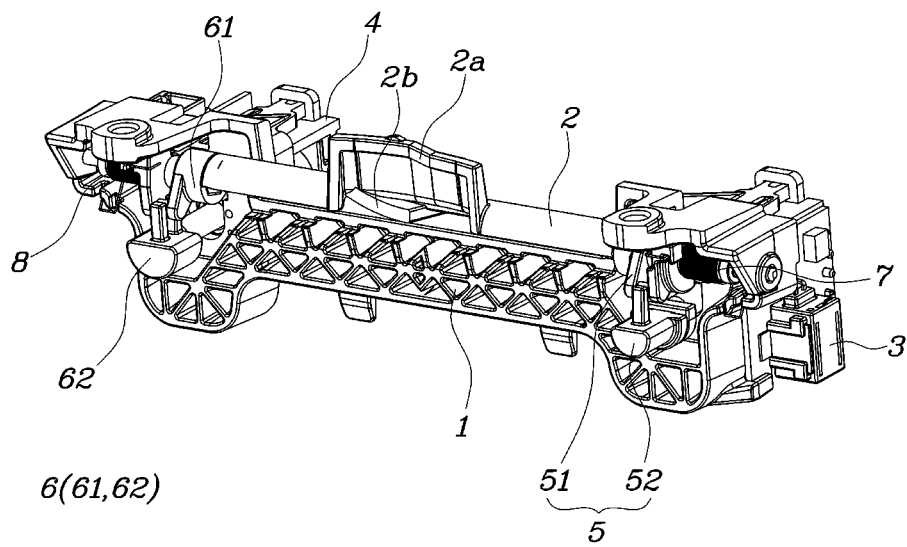
FIG. 2 is an exemplary diagram illustrating a state in which a reflector and a case are removed from FIG. 1 according to an exemplary embodiment of the present disclosure.
Figure 3:
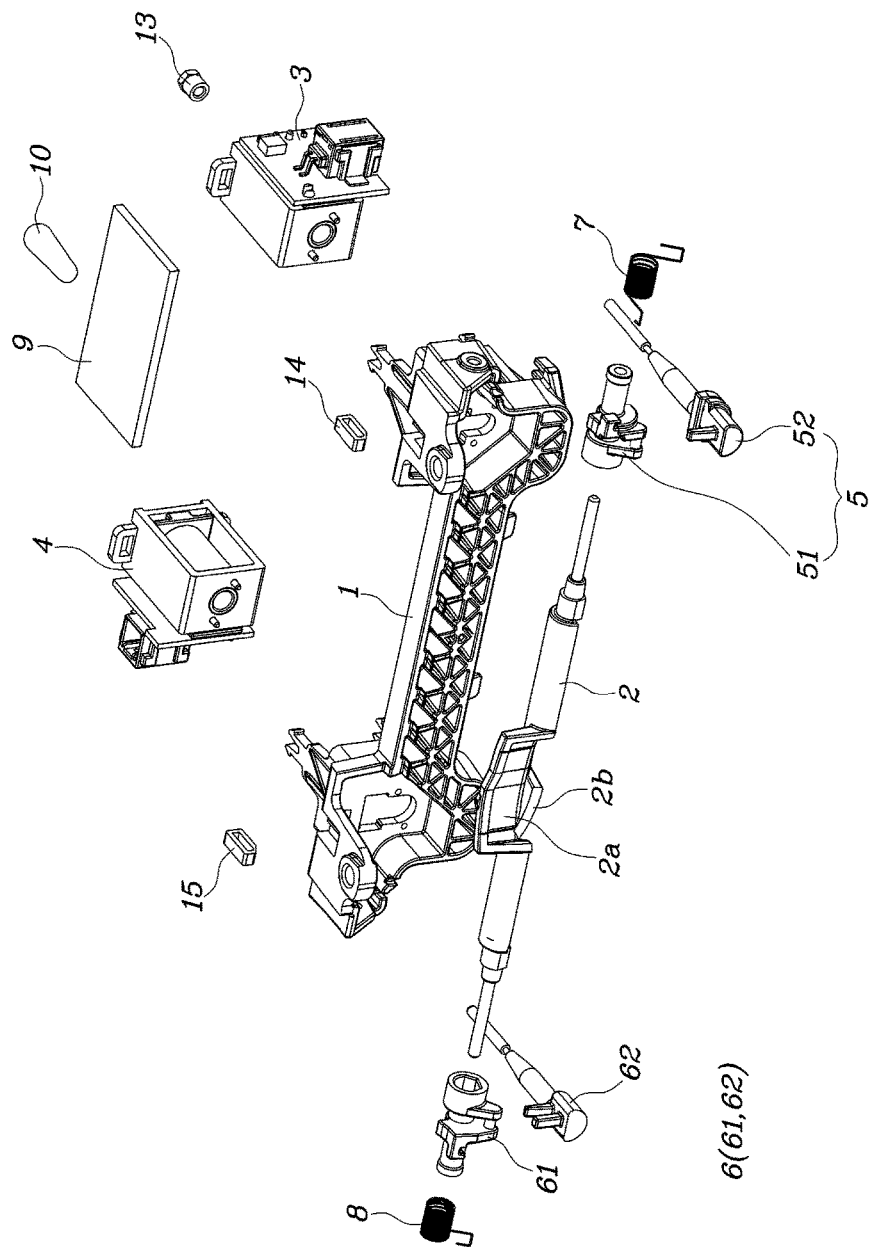
FIG. 3 is an exemplary exploded perspective view of FIG. 2 according to an exemplary embodiment of the present disclosure.
Figure 4:
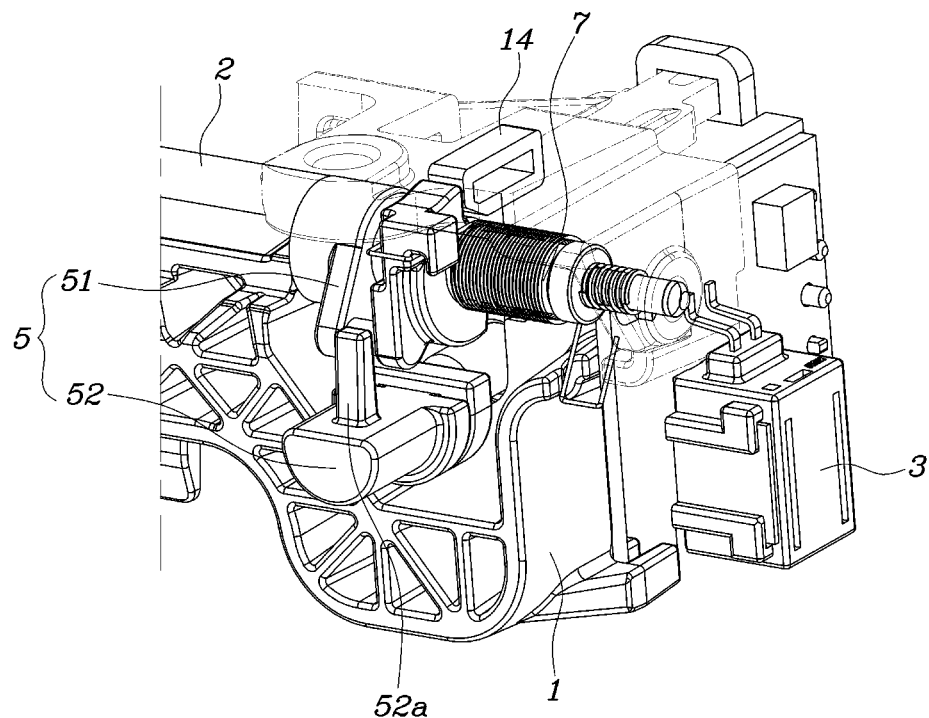
FIG. 4 is an exemplary enlarged view of a right portion where a first solenoid and a first shield operation mechanism are coupled with each other, in FIG. 2 according to an exemplary embodiment of the present disclosure.
Figure 5:
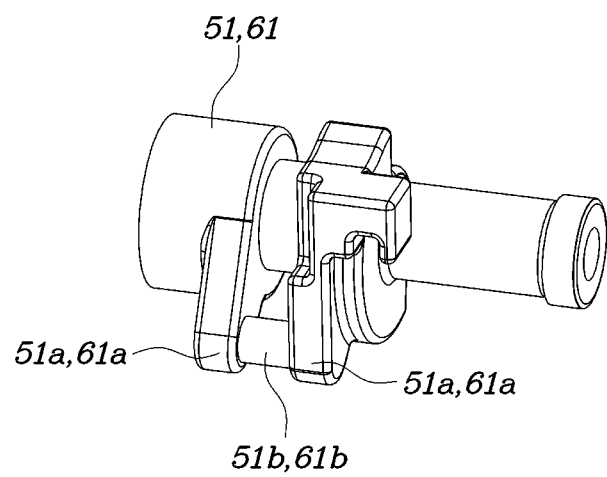
FIGS. 5 and 6 are an exemplary perspective view and a side view of first and second cranks according to an exemplary embodiment of the present disclosure.
Figure 6:
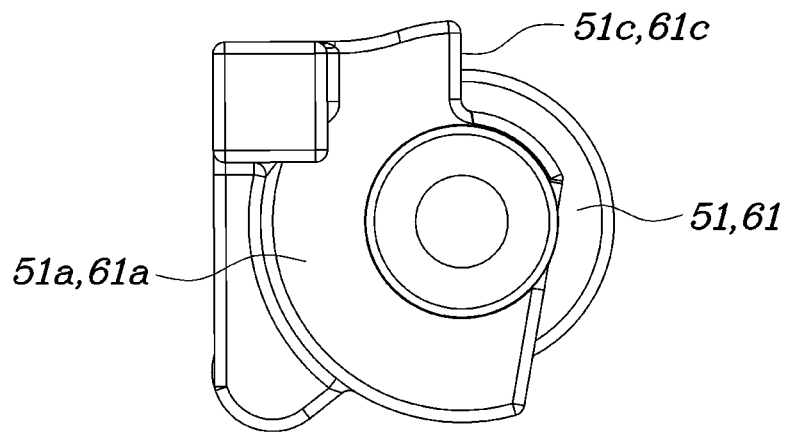
Figure 7:
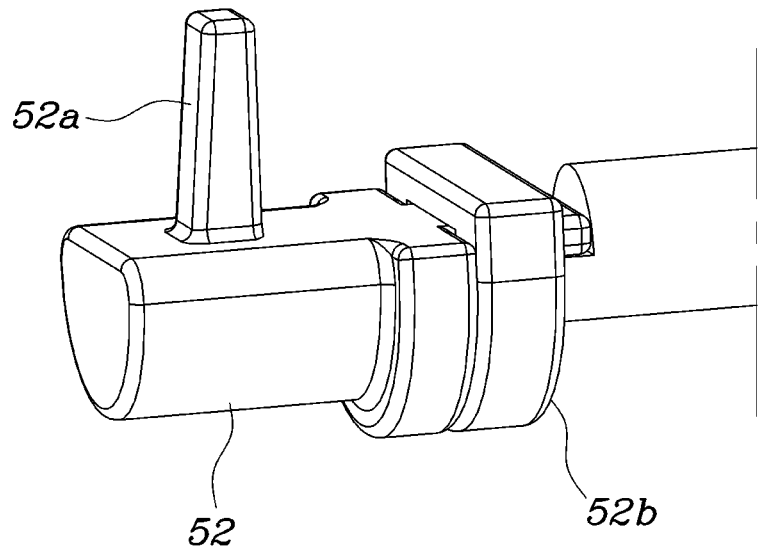
FIGS. 7 and 8 are exemplary diagrams that describe first and second plungers according to an exemplary embodiment of the present disclosure.
Figure 8:
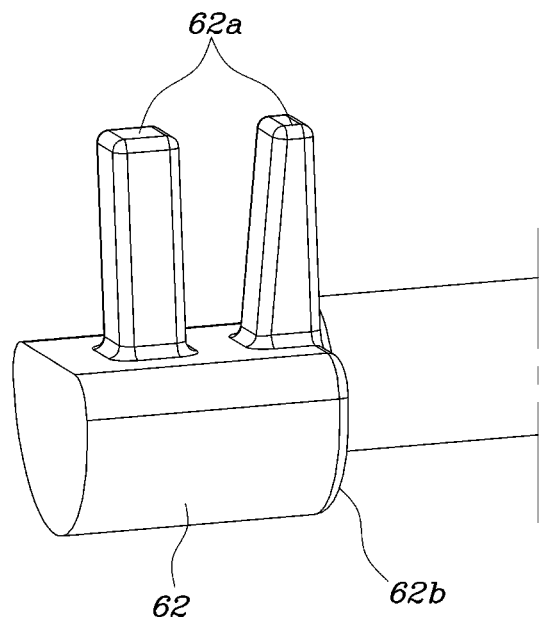

Hereinafter, a head lamp module for a vehicle according to exemplary embodiments of the present disclosure will be described with reference to the accompanying drawings.

The present disclosure will be described more fully hereinafter with reference to the accompanying drawings, in which exemplary embodiments of the invention are shown. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

As illustrated in FIGS. 1 to 20, the head lamp module for a vehicle according to the exemplary embodiment of the present disclosure may include a shield 2 configured to be axially rotated with respect to a shield housing 1 and have a low beam protrusion 2*a* and an ADB protrusion 2*b* formed on an exterior circumferential surface thereof. Further, a first solenoid 3 and a second solenoid 4 may be each fixedly installed at portions that correspond to both end portions of the shield 2 in the shield housing 1. A first shield operation mechanism 5 and a second shield operation mechanism 6 may be disposed between the first and second solenoids 3 and 4 and may be coupled at both ends of the shield 2, respectively. The shield may be configured to rotate in a first direction when a current is applied to the first and second solenoids 3 and 4 to include a difference in a rotation angle of the shield 2. A first return spring 7 and a second return spring 8 may have both ends each fixed to the first and second shield operation mechanisms 5 and 6 and the shield housing 1. An elastic force may accumulate when the shield 2 is rotated in a first direction and rotate the shield 2 in a second direction using the accumulated elastic force when the current to the first and second solenoids 3 and 4 are terminated to return the shield 2.

Further, according to the exemplary embodiment of the present disclosure, the head lamp module for a vehicle may further include a PCB 9 coupled to the first and second solenoids 3 and 4 and configured to adjust a supply of current to the first and second solenoids 3 and 4, a light source 10 coupled to the PCB 9 and configured to be engaged or disengaged (e.g., turned on or off) based on an adjustment of the PCB 9, a reflector 11 configured to reflect light from the light source 10 in a forward direction and a case 12 with the shield housing 1 and the reflector 11 fixedly installed therein. The PCB 9 may be fixedly installed in the shield housing 1 or may be fixedly installed within the case 12. When the low beam protrusion 2*a* is positioned in front of the light source 10 based on the rotation of the shield 2, the beam pattern of the low beam mode is implemented. When both of the low beam protrusion 2*a* and the ADB protrusion 2*b* are not positioned in front of the light source 10, the beam pattern of the high beam mode may be implemented. When the ADB protrusion 2*b* is positioned in front of the light source 10, the beam pattern of the ADB mode may be implemented.

The present disclosure may include the shield 2 configured to rotate by operation of the first and second solenoids 3 and 4 and the first and second shield operation mechanisms 5 and 6 and the beam pattern of the low beam mode, the beam pattern of the high beam mode, or the beam pattern of the ADB mode based on the rotation angle of the shield 2. Accordingly, the manufacturing costs of the head lamp module may be reduced since a stepping motor may be omitted and adjustment of a rotation position of the shield using a separate sensor and complex control logic may be omitted.

The first shield operation mechanism 5 may include a first crank 51 fixedly coupled to a first end portion of the shield 2 to be rotated with the shield 2 and may include a first end portion of the first return spring 7 fixedly coupled thereto. A first plunger 52 may include a first end portion that contacts the first crank 51 and a second end portion that penetrates through the first solenoid 3. The second shield operation mechanism 6 may include a second crank 61 fixedly coupled to a second end portion of the shield 2 to be rotated along with the shield 2 and have a first end portion of the second return spring 8 fixedly coupled thereto and a second plunger 62 configured to have a first end portion contact the second crank 61 and a second end portion penetrate through the second solenoid 4.

According to the exemplary embodiment of the present disclosure, an operation stroke L2 of the second plunger 62 may extend a greater distance than an operation stroke L1 of the first plunger 52. For example, a difference in a rotation angle of the shield 2 may be generated based on the operation of the first and second plungers 52 and 62. In particular, the beam pattern of the high beam mode in the beam pattern of the low beam mode may be implemented based on the operation stroke L1 of the first plunger 52 and the beam pattern of the ADB mode in the beam pattern of the high beam mode based on the operation stroke L2 of the second plunger 62. Further, according to the exemplary embodiment of the present disclosure, the head lamp module for a vehicle may include a stopper 13 coupled to an end portion of a rear of the first plunger 52 that penetrates through the first solenoid 3 and may be configured to adjust a return rotation angle of the shield 2 by contacting a rear surface of the shield housing 1 when the shield 2 is rotated in a second direction to return by a restoring forces of the first return spring 7 and the second return spring 8.

The stopper may be coupled to an end portion of a rear of the second plunger 62 penetrating through the second solenoid 4. The first crank 51 and the second crank 61 may be formed from the same shape. The first crank 51 may include a pair of first flanges 51a that protrude in a radial direction and a first rod 51b disposed between the first flanges 51. In particular, a first end portion of the first plunger 52 may include a first protrusion 52a that contacts the first rod 51b. The first protrusion 51a may be disposed to contact a circumference of a front side of the first rod 51b and may be configured to retract the first rod 51b in a backward direction when the first plunger 51 moves toward the first solenoid 3 to rotate the shield 2 in a first direction.

The second crank 61 may include a pair of second flanges 61a that protrude in a radial direction and a second rod 61b disposed between the second flanges 62. A first end portion of the second plunger 62 may include two second protrusions 62a that contact the second rod 61b and may be disposed to insert the second rod 61b between the two second protrusions 62a. The two second protrusions 62a may be configured to retract the second rod 61b in a backward direction when the second plunger 62 moves toward the second solenoid 4 to rotate the shield 2 in a first direction and protrudes forward by the contact with the second rod 61b when the shield 2 returns while being rotated in a second direction by the second return spring 8 to perform an operation of returning the shield 2.

Further, according to the exemplary embodiment of the present disclosure, the head lamp module may further include a first damper 14 fixedly installed to the shield housing 1 and contacts the first flange 51a to reduce noise and a shock when the shield 2 returns by being rotated in a second direction by the restoring forces of the first return spring 7 and the second return spring 8. A second damper 15 may be fixedly installed to the shield housing 1 and contacts the second flange 61a to reduce noise and a shock when the shield 2 returns by being rotated in a second direction by the restoring force of the second return spring 8. The first and second dampers 14 and 15 may be formed from of any one of rubber, silicon, or synthetic resin having elasticity but are not limited thereto. Reference numerals 51c and 61c illustrated in FIG. 6 become a contact surface that contact the first and second dampers 14 and 15 in the first and second flanges 51a and 61a.

The operation stroke L1 of the first plunger 52 may include a distance when a contact surface 51c of the first flange 51a contacts the first damper 14 until a first stopper surface 52b formed at the first plunger 52 contacts a front surface 1a of the shield housing 1 based on the backward movement of the first plunger 52 toward the first solenoid 3. The operation stroke L2 of the second plunger 52 may include a distance from when a contact surface 61c of the second flange 61a contacts the second damper 15 until a second stopper surface 62b formed at the second plunger 62 contacts the front surface 1a of the shield housing 1 based on the backward movement of the second plunger 52 toward the second solenoid 4 and the operation stroke L2 of the second plunger 62 may be greater than the operation stroke L1 of the first plunger 52.

Figure 9:
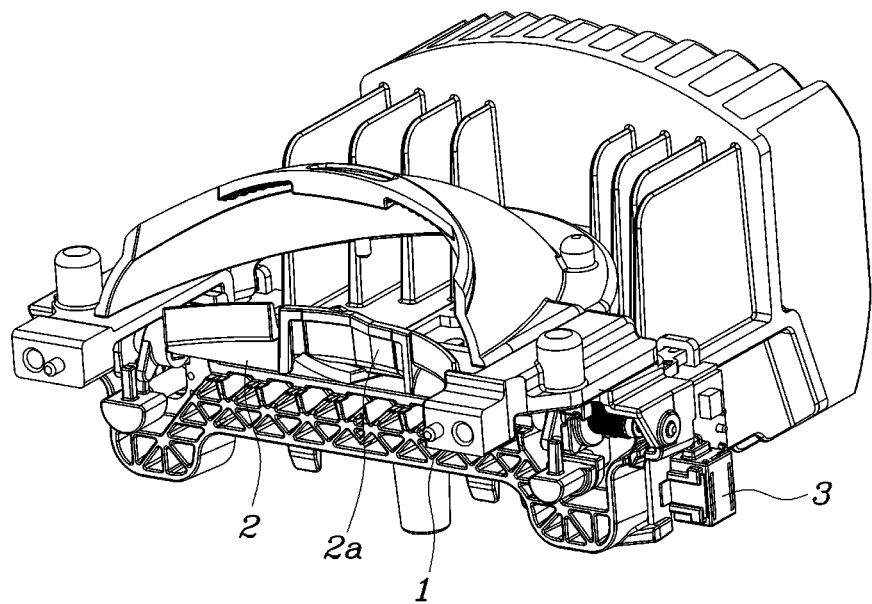
Figure 10:
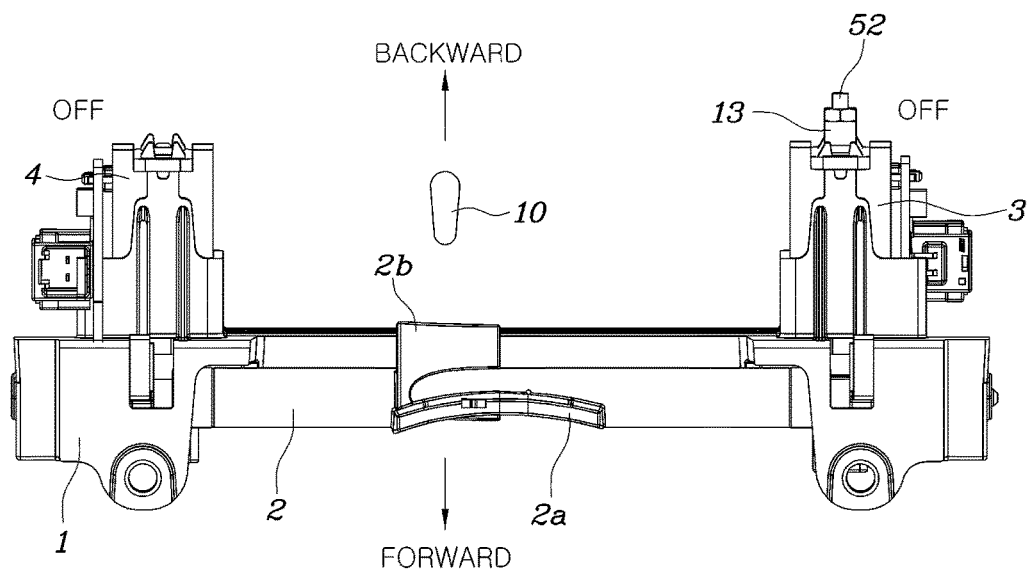
FIG. 10 is an exemplary plan view of a shield state viewed from the top when a low beam mode of operation when a beam pattern is implemented according to an exemplary embodiment of the present disclosure.
Figure 11:
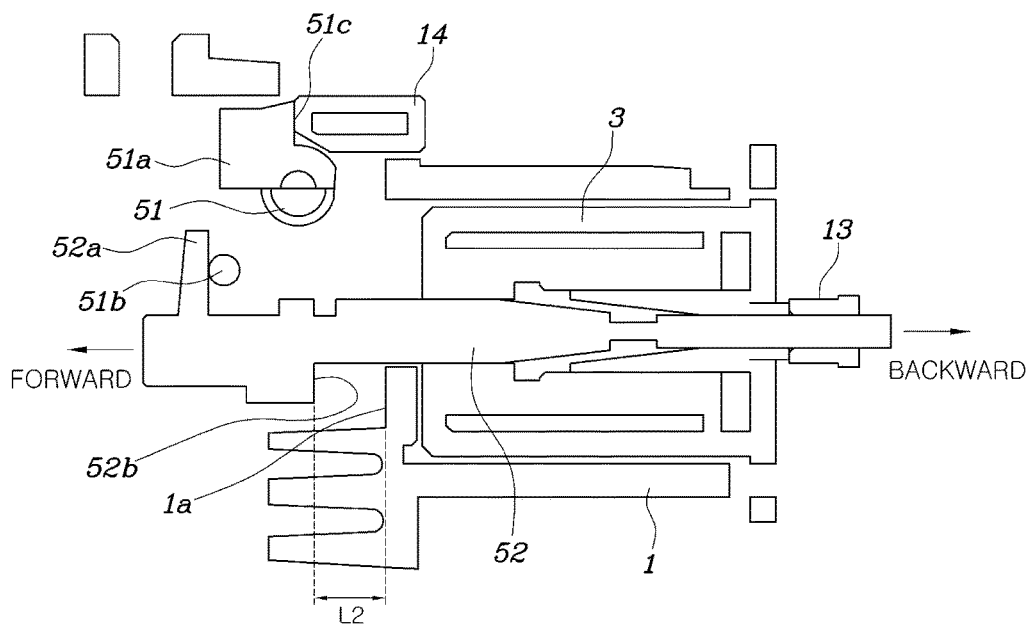
FIG. 11 is an exemplary cross-sectional view of a portion where the first solenoid is positioned when a low beam mode of operation when a beam pattern is implemented according to an exemplary embodiment of the present disclosure.
Figure 12:
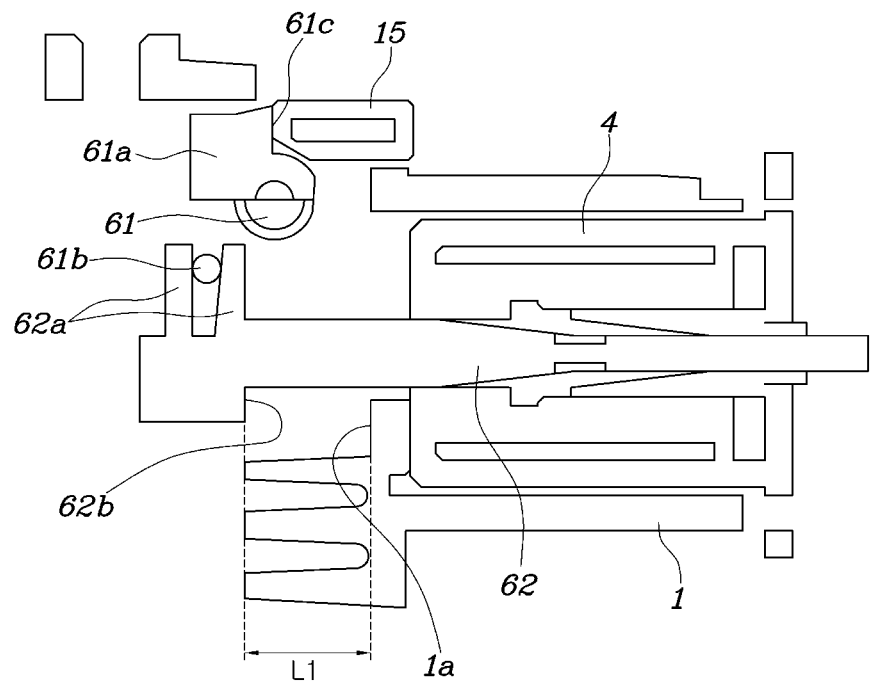
FIG. 12 is an exemplary cross-sectional view illustrating a portion where the second solenoid is positioned when a low beam mode of operation when a beam pattern is implemented according to an exemplary embodiment of the present disclosure.

Hereinafter, an operation of the exemplary embodiment of the present disclosure will be described. FIGS. 9 to 12 are exemplary diagrams illustrating a low beam mode state when the beam pattern of the low beam mode is implemented as a low beam protrusion 2a formed at the shield 2 is positioned in front of the light source 10. FIG. 9 is an exemplary perspective view of the head lamp module when the beam pattern of the low beam mode is implemented. FIG. 10 is an exemplary plan view of a shield state viewed from the top. FIG. 11 is an exemplary cross-sectional view of a portion where the first solenoid is positioned. FIG. 12 is an exemplary cross-sectional view illustrating a portion where the second solenoid is positioned.

When the head lamp is turned on, the beam pattern of the low beam mode is implemented at an early state. Therefore, in the low beam state as described above, the supply of current to the first and second solenoids 3 and 4 may be terminated. Accordingly, both of the first and second solenoids 3 and 4 may be turned off. The restoring forces of the first and second return springs 7 and 8 may be applied to the first and second cranks 51 and 61 to position the low beam protrusion formed at the shield in front of the light source. The first and second flanges 51a and 61a may contact the first and second dampers 14 and 15 and the first and second plungers 52 and 62 may be configured to move forward maximally. The stopper 13 may maintain contact with the rear surface of the shield housing 1.

Figure 13:
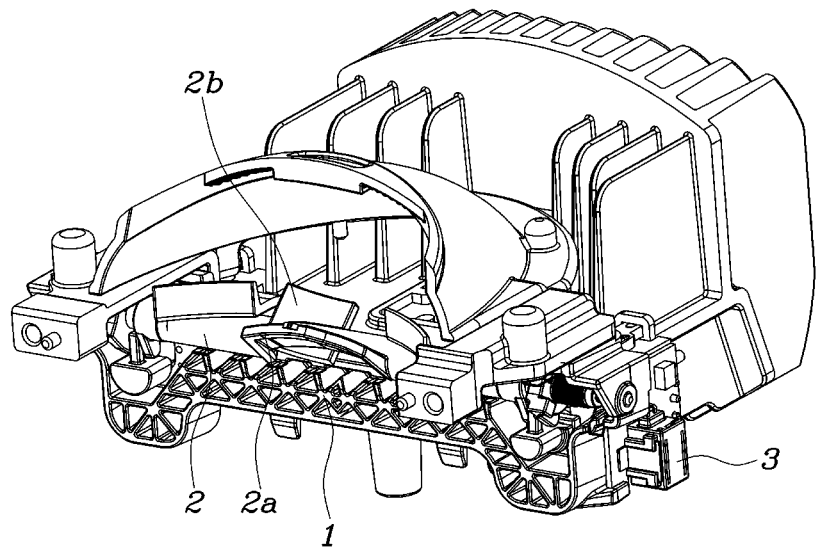
FIG. 13 is an exemplary perspective view of the head lamp module when the beam pattern of the high beam mode is implemented according to an exemplary embodiment of the present disclosure.
Figure 14:
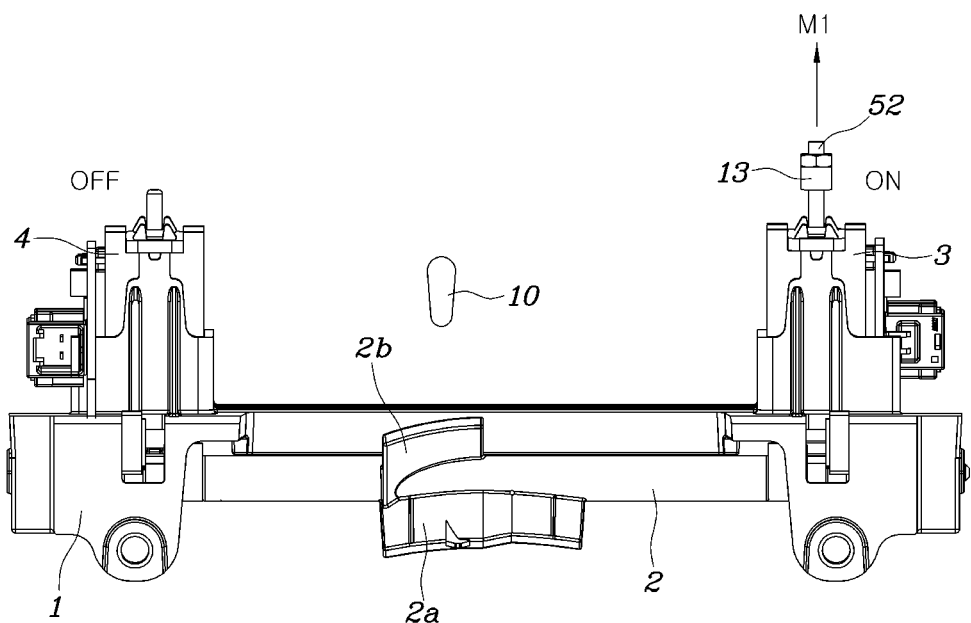
FIG. 14 is an exemplary plan view of the shield state viewed from the top, when the beam pattern of the high beam mode is implemented according to an exemplary embodiment of the present disclosure.
Figure 15:
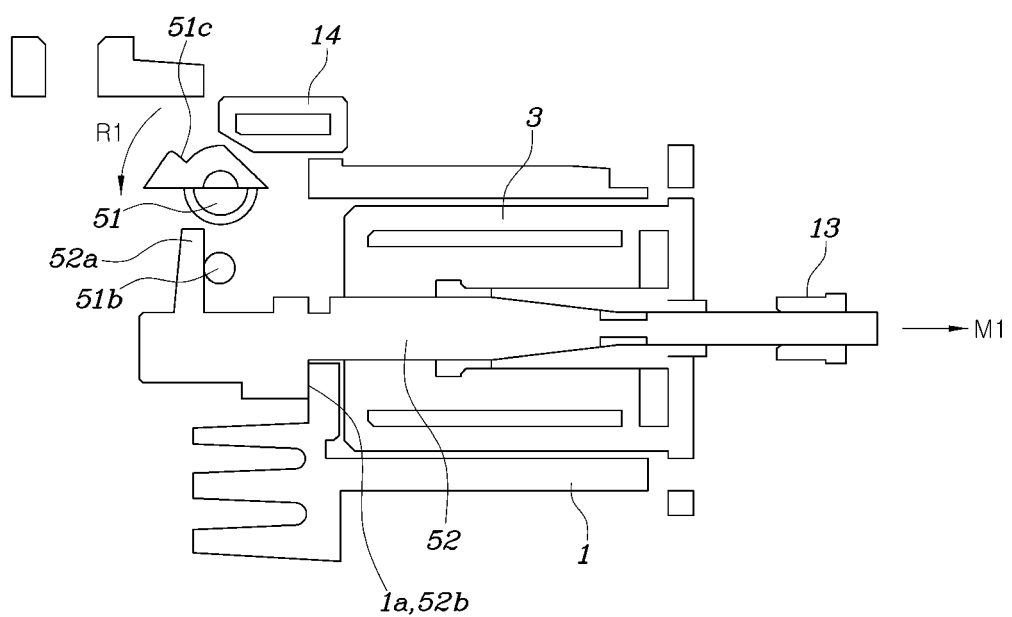
FIG. 15 is an exemplary cross-sectional view of the portion where the first solenoid is positioned when the beam pattern of the high beam mode is implemented according to an exemplary embodiment of the present disclosure.
Figure 16:
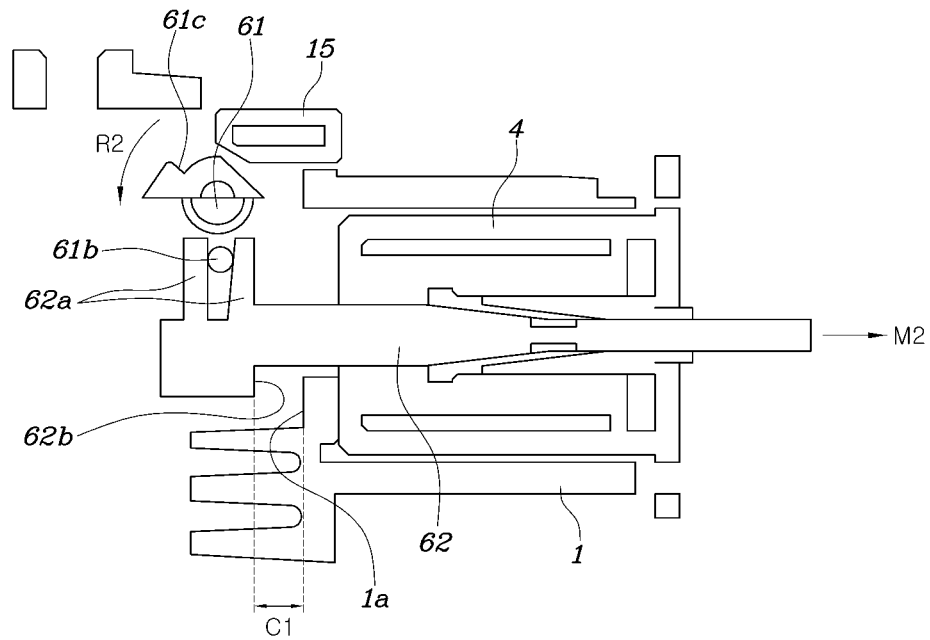
FIG. 16 is an exemplary cross-sectional view illustrating the portion where the second solenoid is positioned when the beam pattern of the high beam mode is implemented according to an exemplary embodiment of the present disclosure.

FIGS. 13 to 16 are exemplary diagrams illustrating a high beam mode when the beam pattern of the high beam mode is implemented as both of the low beam protrusion 2a and an ADB protrusion 2b formed at the shield 2 are not positioned in front of the light source 10. FIG. 13 is an exemplary perspective view of the head lamp module when the beam pattern of the high beam mode is implemented. FIG. 14 is an exemplary plan view of the shield state viewed from the top. FIG. 15 is an exemplary cross-sectional view of the portion where the first solenoid is positioned. FIG. 16 is an exemplary cross-sectional view illustrating the portion where the second solenoid is positioned.

To implement the high beam mode in the low beam mode as described above, a control to supply (on) a current to the first solenoid 3 and continuously terminate a supply of current to the second solenoid 4 may be performed. When a current is supplied to the first solenoid 3, the first plunger 52 may be configured to move backward (arrow M1), the first protrusion 52a may be configured to rotate the first crank 51 in a first direction (e.g., counterclockwise, arrow R1) when the first crank contacts the first rod 51b. At the same time, the shield 2 may be rotated and therefore both of the low beam protrusion 2a and the ADB protrusion 2b may not be positioned in front of the light source 10, thereby implementing the beam pattern of the high beam mode.

When the first plunger 52 moves in a backward direction, the first stopper surface 52b may contact the front surface 1a of the shield housing 1 to constrain the backward movement of the first plunger 52. Further, when the shield 2 is rotated in a first direction as the first plunger 52 moves in a backward direction the second crank 61 coupled to the second end portion of the shield 2 may be rotated together (e.g., arrow R2). For example, a rotating force of the second crank 61 may be transferred to the second protrusion 62a through the second rod 61b and thus transferred to the second plunger 62, to move the second plunger 62 in a backward direction (e.g., arrow M2). Since the operation stroke L2 of the second plunger 62 may extend a greater distance than the operation stroke L1 of the first plunger 52, even when the first stopper surface 52b of the first plunger 52 contacts the front surface 1a of the shield housing 1 and therefore the backward movement of the first plunger 52 may be constrained. The second stopper surface 62b of the second plunger 62 may be spaced apart (e.g., C1) from the front surface 1a of the shield housing 1 by a predetermined distance and may be configured to continuously move the second plunger 62 in a backward direction when a current is supplied to the second solenoid 4.

Figure 17:
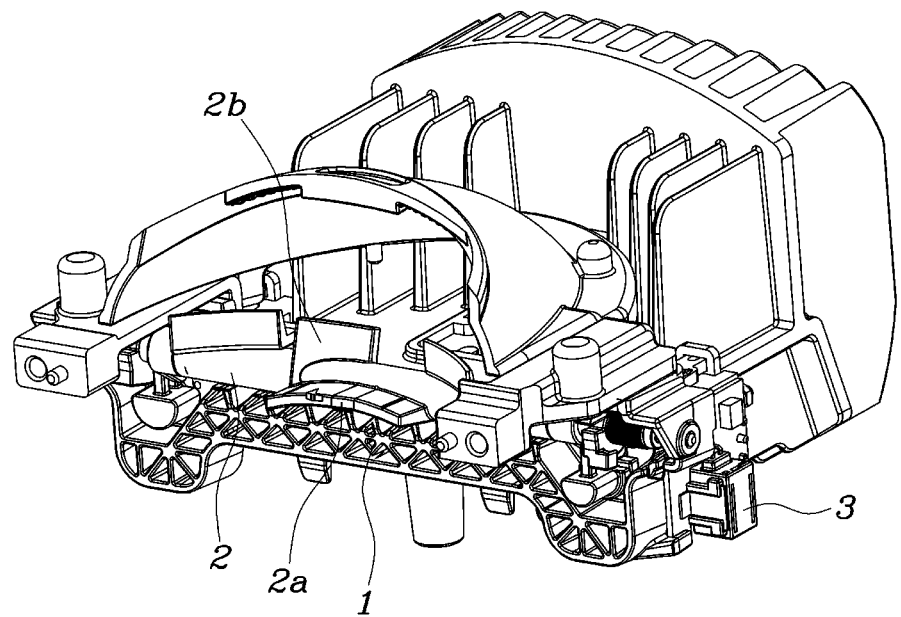
FIG. 17 is an exemplary perspective view of the head lamp module when the beam pattern of the ADB mode is implemented according to an exemplary embodiment of the present disclosure.
Figure 18:
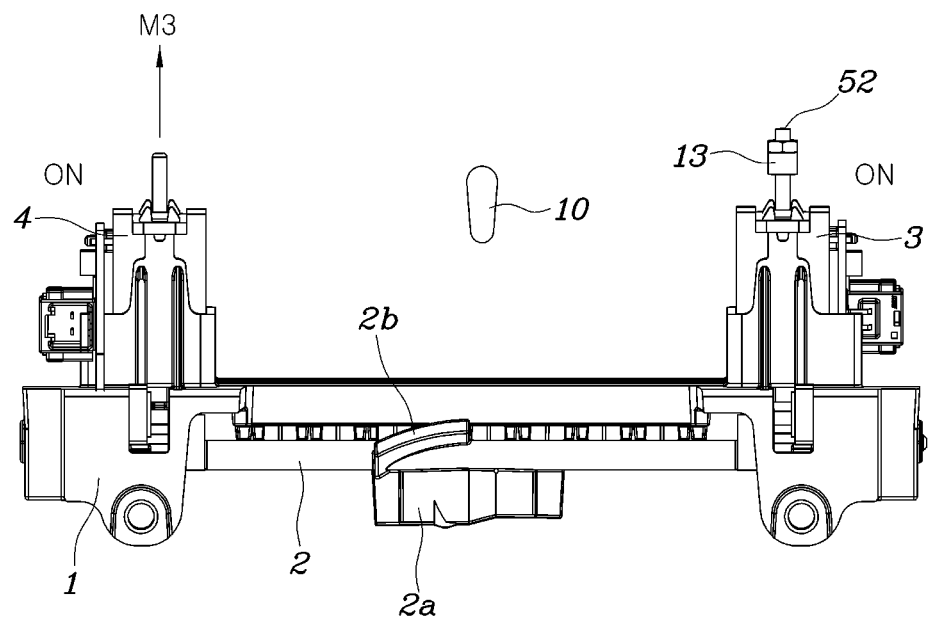
FIG. 18 is an exemplary plan view of the shield state viewed from the top according to an exemplary embodiment of the present disclosure.
Figure 19:
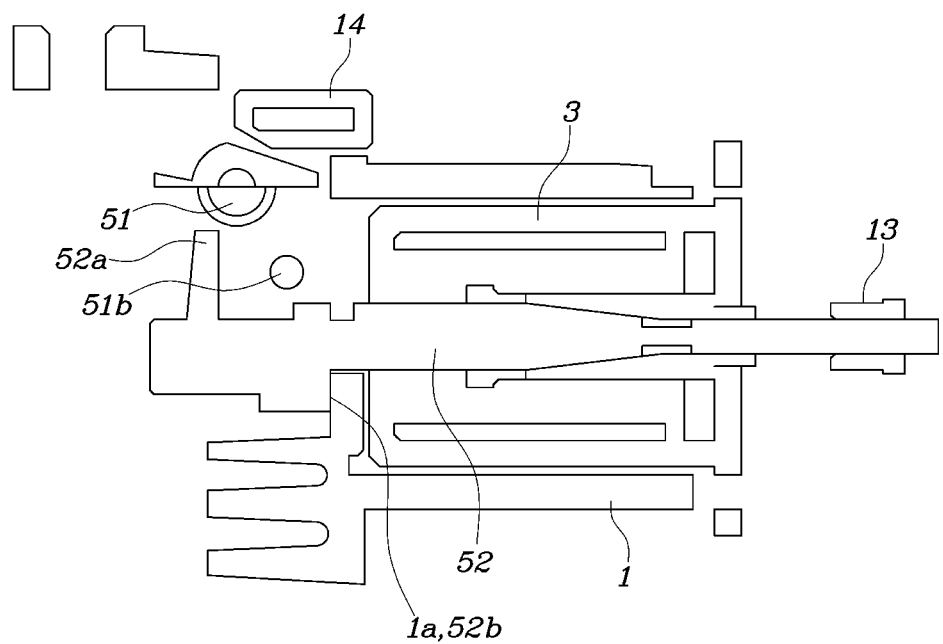
FIG. 19 is an exemplary cross-sectional view of the portion where the first solenoid is positioned according to an exemplary embodiment of the present disclosure.
Figure 20:
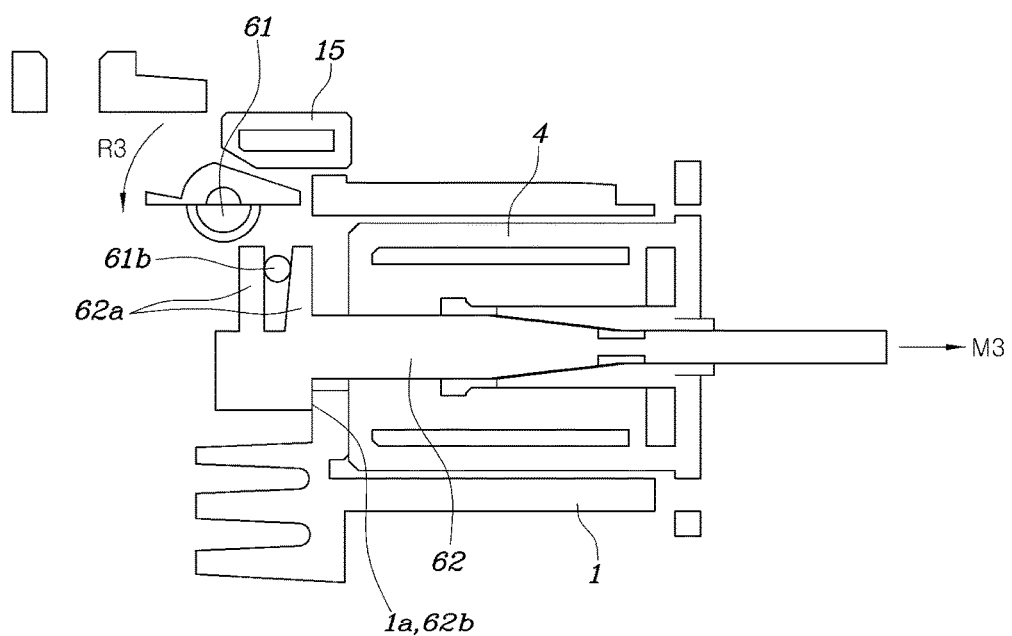
FIG. 20 is an exemplary cross-sectional view illustrating the portion where the second solenoid is positioned according to an exemplary embodiment of the present disclosure.

FIGS. 17 to 20 are exemplary diagrams illustrating an ADB mode state in which the beam pattern of the ADB mode is implemented as the ADB protrusion 2b formed at the shield 2 is positioned in front of the light source 18. In particular, FIG. 17 is an exemplary perspective view of the head lamp module when the beam pattern of the ADB mode is implemented. FIG. 18 is an exemplary plan view of the shield state viewed from the top. FIG. 19 is an exemplary cross-sectional view of the portion where the first solenoid is positioned. FIG. 20 is an exemplary cross-sectional view illustrating the portion where the second solenoid is positioned. To implement the ADB mode in the high beam mode as described above, a supply (on) of current to the first solenoid 3 may be continuously maintained. From this time, a control to supply (on) a current to the second solenoid 4 may be performed.

When a current is supplied to the second solenoid 4, the second plunger 62 may be configured to move backward (e.g., arrow M3) until the second stopper surface 62b contacts the first surface 1a of the shield housing 1. When the second stopper surface 62b contacts the front surface 1a of the shield housing 1 the backward movement of the second plunger 62 may be terminated and the shield 2 may be configured to rotate in a first direction (e.g., counterclockwise, arrow R3) when the second plunger 62 moves backward. In other words, the shield 2 may be configured to rotate together and thus the ADB protrusion 2b may be disposed in front of the light source 10 to implement the beam pattern of the ADB mode. The second plunger 62 may be configured to move until the second stopper surface 62b contacts the front surface 1a of the shield housing 1. In particular, the first plunger 52 may be constrained from backward movement as the first stopper surface 52b maintains the contact state with the front surface 1a of the shield housing 1. However, when the first rod 52b of the first crank 51 is not constrained by the first protrusion 52a of the first plunger 52 a free state may occur and the shield 2 may be configured to rotate (e.g., arrow R3) in a first direction until the backward movement of the second plunger 62 ends. Accordingly, the ADB protrusion 2b may be disposed in front of the light source 10 and may implement the beam pattern of the ADB mode.

On the contrary to the foregoing description upon the returning from the ADB mode to the high beam mode, the supply of current to the first solenoid 3 may be continuously maintained. First, the supply of current to the second solenoid 4 may be terminated and the shield 2 may be configured to be rotated in the opposite direction (e.g., clockwise direction which is an opposite direction to the foregoing counterclockwise direction, the second direction) by the restoring forces of the first return spring 7. Accordingly, the second return spring 8 and the second plunger 62 may be configured to move in a forward direction by the rotation of the shield 2. In other words, as both of the low beam protrusion 2a and the ADB protrusion 2b are not disposed in front of the light source 10, the beam pattern of the high beam mode may be implemented.

Further, during the termination state, the supply of current to the second solenoid 4 may be maintained on the contrary to the foregoing description upon the returning from the high beam mode to the low beam mode. The supply of current to the first solenoid may be terminated and the shield 2 may be configured to be rotated in a second direction (e.g., clockwise) by the restoring force of the first return spring 7 and the first and second plungers 52 and 62 and may be configured to move in a forward direction by the rotation of the shield 2 to return to the initial position. In particular, as the first and second cranks 51 and 52 contact the first and second dampers 14 and 15 and the stopper 13 contacts the rear surface of the shield housing 1 the return action of the first plunger 52 and the return rotation angle of the shield 2 may be constrained. In other words, when the low beam protrusion 2a is positioned in front of the light source 10 the beam pattern of the low beam mode may be implemented.

As described above, according to the exemplary embodiment of the present disclosure, the shield 2 may be rotated by the operations of the first and second solenoids 3 and 4 and the first and second shield operation mechanisms 5 and 6 and the beam pattern of the low beam mode, the beam pattern of the high beam mode, or the beam pattern of the ADB mode may be implemented based on the rotation angle of the shield 2. Accordingly the manufacturing costs of the head lamp module may be reduced and may provide an alternative to operation of the shield using the expensive stepping motor and implement the beam pattern based thereon. In particular, the rotation position of the shield may be adjusted using the separate sensor. The complex control logic may be included based on the use of the stepping motor and the head lamp module may be applied.

Further, when the head lamp driving system fails in the high beam mode or the ADB mode, the fail safe function may be performed. When the fail safe function is performed, the supply of current to the second and first solenoids 4 and 3 in the high beam mode or the ADB mode as described above may be sequentially terminated In particular, the beam pattern of the high beam mode or the beam pattern of the ADB mode may be adjusted to the beam pattern of the low beam mode. Accordingly, the driver may secure the sufficient visual range through the beam pattern of the low beam mode even though the emergency situation occurs, thereby increasing the driving safety of the vehicle.

According to the head lamp module for a vehicle in accordance with the exemplary embodiment of the present disclosure, the shield may be configured to be rotated by operations of the first and second solenoids and the first and second shield operation mechanisms and the beam pattern of the low beam mode, the beam pattern of the high beam mode, or the beam pattern of the ADB mode may be implemented based on the rotation angle of the shield. Accordingly the manufacturing costs of the head lamp module may be reduced in comparison with the manufacturing costs of the existing head lamp module of operating the shield that require use of the expensive stepping motor to implement the beam pattern. Further, the beam pattern of the low beam mode may be implemented when the fail safe function may be performed based on the failure occurrence in the high beam mode condition or the ADB mode condition. Accordingly, the driver may secure the sufficient visual range even during an emergency situation, thereby promoting the driving safety Although the present disclosure has been shown and described with respect to specific exemplary embodiments, it will be obvious to those skilled in the art that the present disclosure may be variously modified and altered without departing from the spirit and scope of the present disclosure as defined by the following claims.

What is claimed is:

1. A head lamp module for a vehicle, comprising:
a shield configured to be axially rotated with respect to a shield housing and have a low beam protrusion and an adaptive driving beam (ADB) protrusion formed on an exterior circumferential surface thereof;
a first solenoid and a second solenoid each fixedly installed at portions that correspond with both end portions of the shield in the shield housing;
a first shield operation mechanism and a second shield operation mechanism disposed between the first and second solenoids and both ends of the shield, respectively, and configured to rotate the shield in a first direction when a current is applied to the first and second solenoids and to have a difference in a second rotation angle of the shield; and
a first return spring and a second return spring having both ends each coupled to the first and second shield operation mechanism and the shield housing and configured to accumulate an elastic force when the shield is rotated in a first direction and rotate the shield rotated in the first direction in a second direction using the accumulated elastic force when the current to the first and second solenoids to return the shield is terminated.

2. The head lamp module of claim 1, further comprising:
a printed circuit board (PCB) configured to adjust a supply of current to the first and second solenoids;
a light source coupled to the PCB in circuit and configured to be turned on or off based on a control of the PCB;
a reflector configured to forwardly reflect light from the light source; and
a case that includes shield housing and the reflector is coupled therein.

3. The head lamp module of claim 1, wherein the first shield operation mechanism includes:
a first crank fixedly coupled to a first end portion of the shield and configured to be rotated along with the shield and have a first end portion of the first return spring fixedly coupled thereto and a first plunger that includes a first end portion that contacts the first crank and a second end portion that penetrates through the first solenoid;
the second shield operation mechanism includes a second crank fixedly coupled to a second end portion of the shield and configured to be rotated along with the shield and have a first end portion of the second return spring fixedly coupled thereto and a second plunger that includes a first end portion that contacts the second crank and a second end portion that penetrates through the second solenoid; and
an operation stroke of the second plunger configured to be greater than an operation stroke of the first plunger to generate the difference in a rotation angle of the shield based on operations of the first and second plungers.

4. The head lamp module of claim 1, further comprising:
a stopper coupled to an end portion of a rear of a first plunger that penetrates through the first solenoid and configured to adjust a return rotation angle of the shield by contacting a rear surface of the shield housing when the shield is rotated in the second direction by a restoring forces of the first return spring and the second return spring.

5. The head lamp module of claim 3, wherein the first crank includes a pair of first flanges that protrude in a radial direction and a first rod disposed between the first flanges,
a first end portion of the first plunger is provided with a first protrusion that contacts the first rod, and
the first protrusion is disposed to contact a circumference of a front side of the first rod to retract the first rod backward when the first plunger moves toward the first solenoid to rotate the shield in the first direction.

6. The head lamp module of claim 3, wherein the second crank includes a pair of second flanges that protrude in a radial direction and a second rod disposed between the second flanges,
a first end portion of the second plunger includes two second protrusions that contact the second rod and the second rod is configured to be inserted between the two second protrusions, and
the two second protrusions are configured to retract the second rod backward when the second plunger moves toward the second solenoid to rotate the shield in the first direction and protrudes forward by the contact with the second rod when the shield returns while being rotated in the second direction by the second return spring to perform an operation of returning the shield.

7. The head lamp module of claim 5, further comprising:
a first damper fixedly installed to the shield housing and configured to contact the first flange to reduce noise and a shock when the shield returns by being rotated in the second direction by the restoring forces of the first return spring and the second return spring.

8. The head lamp module of claim 6, further comprising:
a second damper fixedly installed to the shield housing and configured to contact the second flange to reduce noise and a shock when the shield returns by being rotated in the second direction by the restoring force of the second return spring.

9. The head lamp module of claim 7, wherein the operation stroke of the first plunger includes a distance from the first flange that contacts the first damper until a first stopper surface formed at the first plunger contacts a front surface of the shield housing when the first plunger is moved backward toward the first solenoid.

10. The head lamp module of claim 8, wherein the operation stroke of the second plunger includes a distance from the second flange that contacts the second damper until a second stopper surface formed at the second plunger contacts the front surface of the shield housing when the second plunger is moved backward toward the second solenoid.

* * * * *